US010681363B2

(12) United States Patent
Yang et al.

(10) Patent No.: US 10,681,363 B2
(45) Date of Patent: Jun. 9, 2020

(54) LOSSLESS COMPRESSION METHOD AND SYSTEM APPLIED TO HARDWARE VIDEO DECODING

(71) Applicant: ALLWINNER TECHNOLOGY CO., LTD., Zhuhai (CN)

(72) Inventors: Shaojun Yang, Zhuhai (CN); Chengxing Xie, Zhuhai (CN)

(73) Assignee: ALLWINNER TECHNOLOGY CO., LTD., Zhuhai (CN)

( * ) Notice: Subject to any disclaimer, the term of this patent is extended or adjusted under 35 U.S.C. 154(b) by 0 days.

(21) Appl. No.: 16/070,028

(22) PCT Filed: Dec. 8, 2016

(86) PCT No.: PCT/CN2016/108969
§ 371 (c)(1),
(2) Date: Jul. 13, 2018

(87) PCT Pub. No.: WO2017/133315
PCT Pub. Date: Aug. 10, 2017

(65) Prior Publication Data
US 2019/0037226 A1    Jan. 31, 2019

(30) Foreign Application Priority Data

Feb. 3, 2016    (CN) .......................... 2016 1 0077393

(51) Int. Cl.
*H04N 19/426*    (2014.01)
*H04N 19/52*     (2014.01)
(Continued)

(52) U.S. Cl.
CPC ......... *H04N 19/426* (2014.11); *H04N 19/182* (2014.11); *H04N 19/186* (2014.11);
(Continued)

(58) Field of Classification Search
CPC .... H04N 19/182; H04N 19/186; H04N 19/52; H04N 19/59; H04N 19/593; H04N 19/91; H04N 19/42–19/429
See application file for complete search history.

(56) References Cited

U.S. PATENT DOCUMENTS 7,868,898 B2 * 1/2011 Jeffrey ..................... G09G 5/39
                                                 345/531
2009/0161753 A1 * 6/2009 Youn .................... H04N 19/176
                                                 375/240.01
(Continued)

FOREIGN PATENT DOCUMENTS

CN    101022553    8/2007
CN    101252694    8/2008
(Continued)

OTHER PUBLICATIONS

Zhou et. al. "A Frame-Parallel 2 Gpixel/s Video Decoder Chip for UHDTV and 3-DTV/FTV Applications" IEEE Transactions on Very Large Scale Integration (VLSI) Systems, vol. 23, No. 12, Dec. 2015.*

(Continued)

*Primary Examiner* — Mohammed S Rahaman
(74) *Attorney, Agent, or Firm* — Cozen O'Connor (57) ABSTRACT

A lossless compression method and system applied to hardware video decoding are provided. The method sequentially includes a video decoding step, a compression step, a storage step and a decompression step, wherein in the compression step, lossless compression is performed by taking a 16×4 Y luma block and a corresponding 8×2 U chroma block and V chroma block as a compression unit; in the storage step, compact compression and storage is performed on a complete frame of image by taking four pixel lines as a unit, and a starting address of every four pixel lines is fixed; and the video decoding step includes a reference (Continued)

frame reading step, and a two-level Cache structure is adopted in the reference frame reading step. The system is a system applying the method.

4 Claims, 9 Drawing Sheets

(51) Int. Cl.
    *H04N 19/59*     (2014.01)
    *H04N 19/182*     (2014.01)
    *H04N 19/186*     (2014.01)
    *H04N 19/593*     (2014.01)
    *H04N 19/91*     (2014.01)

(52) U.S. Cl.
    CPC ............. *H04N 19/52* (2014.11); *H04N 19/59* (2014.11); *H04N 19/593* (2014.11); *H04N 19/91* (2014.11)

(56) References Cited

U.S. PATENT DOCUMENTS

| | | | |
|---|---|---|---|
| 2009/0324112 A1 | 12/2009 | Park | |
| 2010/0223237 A1* | 9/2010 | Mishra | ................ G06F 9/30156 707/693 |
| 2013/0136175 A1* | 5/2013 | Wang | ................ H04N 19/176 375/240.12 |

FOREIGN PATENT DOCUMENTS

| | | |
|---|---|---|
| CN | 102740075 | 10/2012 |
| CN | 103152571 | 6/2013 |
| CN | 103729449 | 4/2014 |
| CN | 104506793 | 4/2015 |
| CN | 104780374 | 7/2015 |
| CN | 105578190 | 5/2016 |
| KR | 2010/0003167 | 1/2010 |
| WO | WO 2013/001278 | 1/2013 |
| WO | WO 2014/066182 | 5/2014 |

OTHER PUBLICATIONS

Zhou et. al. "Reducing Power Consumption of HEVC Codec With Lossless Reference Frame Recompression", ICIP 2014.*
Zhou et. al. "A 530Mpixels/s 4096x2160@60fps H.264/AVC High Profile Video Decoder Chip" 2010 Symposium on VLSI Circuits/Technical Digest of Technical Papers.*
Zhou Jinjia et al.: "A Frame-Parallel 2 Gpixel/s Video Decoder Chip for UHDTV and 3-DTV/FTV Applications", IEEE Transactions on Very Large Scale Integration (VLSI) Systems, IEEE Service Center, Piscataway, NJ, USA vol. 23, No. 12, Dec. 1, 2015 pp. 2768-2781 XP011590975.
Dajian Zhou et al.: "A 530 Mpixels/s 4096x2160@uarr ofps H.264/AVC High Profile Video Decoder Chip", IEEE Journal of Solid-State Circuits, IEEE Service Center, Piscataway, NJ, USA, vol. 46, No. 4, Apr. 1, 2011, pp. 777-788, XP011351091.
Dajian Zhou et al.: "Reducing Power Consumption of HEVC Codec with lossless reference frame recompression" 2014 IEEE International Conference on Image Processing (ICIP), IEEE, Oct. 27, 2014, pp. 2120-2124, XP032966966.
Supplementary European Search Report dated Nov. 4, 2019 issued in corresponding application No. EP 16 88 9122.

* cited by examiner

|   | 0 | 1 | 2 | 3 | 4 | 5 | 6 | 7 |
|---|---|---|---|---|---|---|---|---|
| 0 |   | 0 | 0 | 0 | 0 | 0 | 0 | 0 |
| 1 | 1 | 3 | 1 | 3 | 2 | 4 | 2 | 4 |
| 2 | 1 | 3 | 1 | 3 | 2 | 4 | 2 | 4 |
| 3 | 1 | 3 | 1 | 3 | 2 | 4 | 2 | 4 |

FIG. 4

| BLH(3bit) | Min | Max |
|---|---|---|
| 0 | 0 | 0 |
| 001 | -1 | 0 |
| 010 | -2 | 1 |
| 011 | -4 | 3 |
| 100 | -8 | 7 |
| 101 | -16 | 15 |
| 110 | -32 | 31 |
| 111 | Original value ||

| Offset (16bit) | Length (10bit) | Length (10bit) | Length (10bit) | Length (10bit) |

LOSSLESS COMPRESSION METHOD AND SYSTEM APPLIED TO HARDWARE VIDEO DECODING

PRIORITY CLAIM

This is a U.S. national stage of application No. PCT/CN2016/108969, filed on Dec. 8, 2016. Priority is claimed on Chinese Application No. CN201610077393, filed Feb. 3, 2016, the content of which is incorporated here by reference.

TECHNICAL FIELD

The present invention belongs to the field of video decoding, and particularly relates to a lossless compression method and lossless compression system applied to hardware video decoding. The present invention is based on China Patent Application No. 201610077393.5 filed on Feb. 3, 2016, which is hereby incorporated as a reference closely related to the present invention.

BACKGROUND

Along with the constant increase of video resolutions from original D1 and 720P to 1,080P and 4K, a bandwidth occupied by video decoding may consequently increase. Moreover, with prevailing and popularization of 4K panels, a bandwidth consumed by display equipment also increases at the same time. For example, for decoding of a 4K@30FPS code stream and display of 4K YUV data, bandwidths occupied by video decoding equipment and display equipment are evaluated as follows:

the video decoding equipment: 4K×2K×1.5×3.5× 30=1,260M bytes, and the display equipment: 4K×2K×1.5×60=720M bytes.

A sum of the two has reached 1.98G bytes, approximate to 2G If an 8K video is decoded and a display panel is also 8K, the required bandwidth is further required to be doubled to be approximate to 4G Such a high bandwidth requirement is a very heavy burden for a present limited Double Data Rate (DDR) bandwidth and has become a major bottleneck for ultrahigh-resolution video decoding and display. There is an urgent need for adding a lossless compression algorithm into a video decoding process to achieve a purpose of bandwidth reduction.

Technical Problem

In the field of hardware video decoding at present, for a 4K/8K high-resolution video, a decoding bandwidth is very large, and if lossless compression is not adopted, as analyzed above, a bandwidth for decoding a 4K-resolution video code stream has reached 1.98G and is too large, while a DDR operating frequency of ordinary video playing equipment such as a tablet is usually not high in consideration of cost performance, so that a requirement of decoding into 30 frames for smooth playing may not be met, and the phenomena of picture jump and the like may exist. An ordinary lossless compression algorithm like a Joint Photographic Experts Group-Lossless (JPEG-LS) algorithm is complex in implementation and interdependence of compression and decompression of each pixel makes a compression and decompression speed very low and further brings influence to video decoding performance, so that there exist the problems of low compression rate of the compression algorithm, limited bandwidth reduction and the like.

Technical Solution

For the problem of high bandwidth requirement of an existing hardware video decoding module, the present invention designs a Video Decoder Lossless Frame Compression (VD-LFRC) algorithm, which may be perfectly matched with a hardware video decoding module. Meanwhile, a bandwidth consumed in reading of reference frame data in a decoding process of the hardware video decoding module is about 70% of a total bandwidth. For reducing bandwidth consumption in reading of the reference frame data, a two-level Cache design architecture matched with the VD-LFRC algorithm is adopted in the present invention, and by the two-level Cache design architecture, the reading bandwidth of the reference frame data is reduced, thereby reducing the bandwidth consumption in the decoding process of the hardware video decoding module.

A main purpose of the present invention is to provide a lossless compression method applied to hardware video decoding.

Another purpose of the present invention is to provide a lossless compression system applied to hardware video decoding.

To achieve the main purpose, the lossless compression method applied to hardware video decoding, provided by the present invention, sequentially includes a video decoding step, a compression step, a storage step and a decompression step, wherein the video decoding step includes a step of decoding a video code stream and outputting decoded YUV data; the compression step includes a step of performing lossless compression on the YUV data output by the video decoding step; the storage step includes a step of storing the losslessly compressed data; and the decompression step includes a step of decompressing the losslessly compressed data and recovering original YUV data, wherein, in the compression step, lossless compression is performed by taking a 16×4 Y luma block and a corresponding 8×2 U chroma block and 8×2 V chroma block as a compression unit; in the storage step, compact compression and storage is performed on a complete frame of image by taking four pixel lines as a unit, and a starting address of every four pixel lines is fixed; and the decoding step includes a reference frame reading step, a two-level Cache structure is adopted in the reference frame reading step, and in the two-level Cache structure, the first level is a Compress-Cache which caches the compressed data, and the other level is a 2D-Cache (Two-Dimensional Cache) which caches decompressed original YUV data.

A preferred solution is that the compression step includes a prediction step, a grouping step and an entropy coding step; the prediction step includes a step of predicting Y luma blocks, U chroma blocks and V chroma blocks through prediction modes respectively and a step of calculating predicted values; the grouping step includes a step of calculating residuals according to the predicted values and original values and a step of grouping the residuals; and the entropy coding step includes a step of performing entropy coding on values of the residuals grouped in the grouping step.

From the above, it can be seen that the luma blocks and the chroma blocks are predicated to obtain the predicted values of each pixel, then the residuals of each pixel are obtained through the predicted values, and after entropy coding is performed on the residuals, a total bit number after the chroma blocks and the luma blocks are coded may be calculated.

A preferred solution is that the prediction modes include horizontal prediction, vertical prediction and mean prediction.

From the above, it can be seen that horizontal prediction, vertical prediction and mean prediction algorithms are used for compression of the chroma blocks and the luma blocks, and the prediction mode capable of achieving highest compression ratio, i.e., a smallest bit number required, may be obtained by multiple prediction methods and subsequent grouping and entropy coding.

A preferred solution is that the entropy coding step includes a step of calculating bit numbers of the Y luma blocks, the U chroma blocks or the V chroma blocks under each prediction mode according to the prediction mode and the residuals and a step of finding the prediction mode making smallest bit numbers of the Y luma blocks, the U chroma blocks or the V chroma blocks after prediction, and judging whether the smallest bit numbers exceed original bit numbers of the Y luma blocks, the U chroma blocks and the V chroma blocks or not.

From the above, it can be seen that the smallest bit numbers required by the luma blocks or the chroma blocks after predictive coding under different prediction modes are found and then magnitudes of the smallest bit numbers and the original bit numbers of the luma blocks or the chroma blocks are judged, thereby determining the bit numbers of the luma blocks or the chroma blocks.

To achieve the other purpose of the present invention, the lossless compression system applied to hardware video decoding, provided by the present invention, includes a video decoding module, a compression module, a storage module and a decompression module, wherein the video decoding module is configured to decode a video code stream and output decoded YUV data to the compression module; the compression module performs lossless compression on the decoded YUV data and outputs it to the storage module; the storage module stores the compressed data into an external memory; and the decompression module decompresses the data stored in the external memory, recovers it into original YUV data and outputs it to the video decoding module, wherein the compression module performs lossless compression by taking a 16×4 Y luma block and a corresponding 8×2 U chroma block and 8×2 V chroma block as a compression unit; the storage module performs compact compression and storage on a complete frame of image by taking four pixel lines as a unit, and a starting address of every four pixel lines is fixed; and the video decoding module includes a reference frame reading module configured to read a reference frame, a two-level Cache structure is adopted for reading the reference frame, and in the two-level Cache structure, the first level is a Compress-Cache configured to cache the compressed video data, and the other level is a 2D-Cache configured to cache the decompressed video data.

Beneficial Effect

According to the method of the present invention, a reference frame data reading bandwidth is greatly reduced, thereby reducing bandwidth consumption in decoding of the video decoding module.

According to the system of the present invention, block data decoded and output by the video decoding module may be timely compressed without developing an additional buffer for caching the data.

The present invention will further be described below in combination with the accompanying drawings and embodiments.

DETAILED DESCRIPTION OF THE ILLUSTRATED EMBODIMENTS

Figure 1:
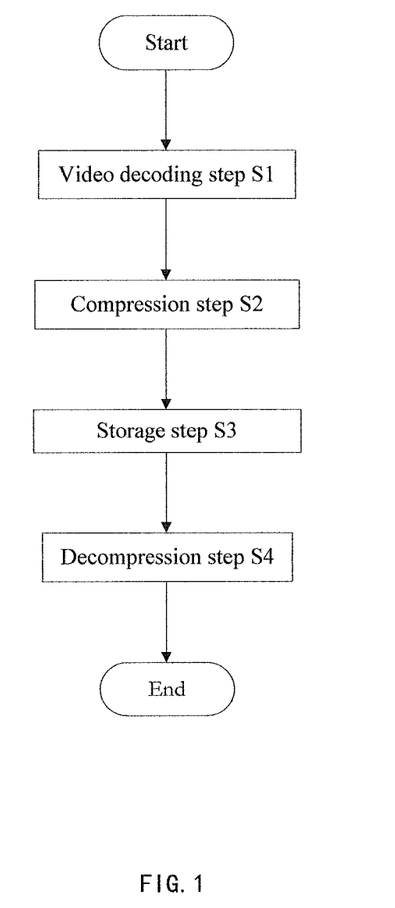
FIG. 1 is a flowchart of a lossless compression method applied to hardware video decoding according to the present invention.

Referring to FIG. 1, FIG. 1 is a flowchart of a lossless compression method applied to hardware video decoding according to the present invention. At first, a video decoding step S1 is executed to decode a video code stream and output decoded YUV data. Then, a compression step S2 is executed to perform lossless compression on the YUV data output in the video decoding step S1. Next, a storage step S3 is executed to store the losslessly compressed data. Finally, a decompression step S4 is executed to decompress the losslessly compressed data and recover original YUV data.

Figure 2:
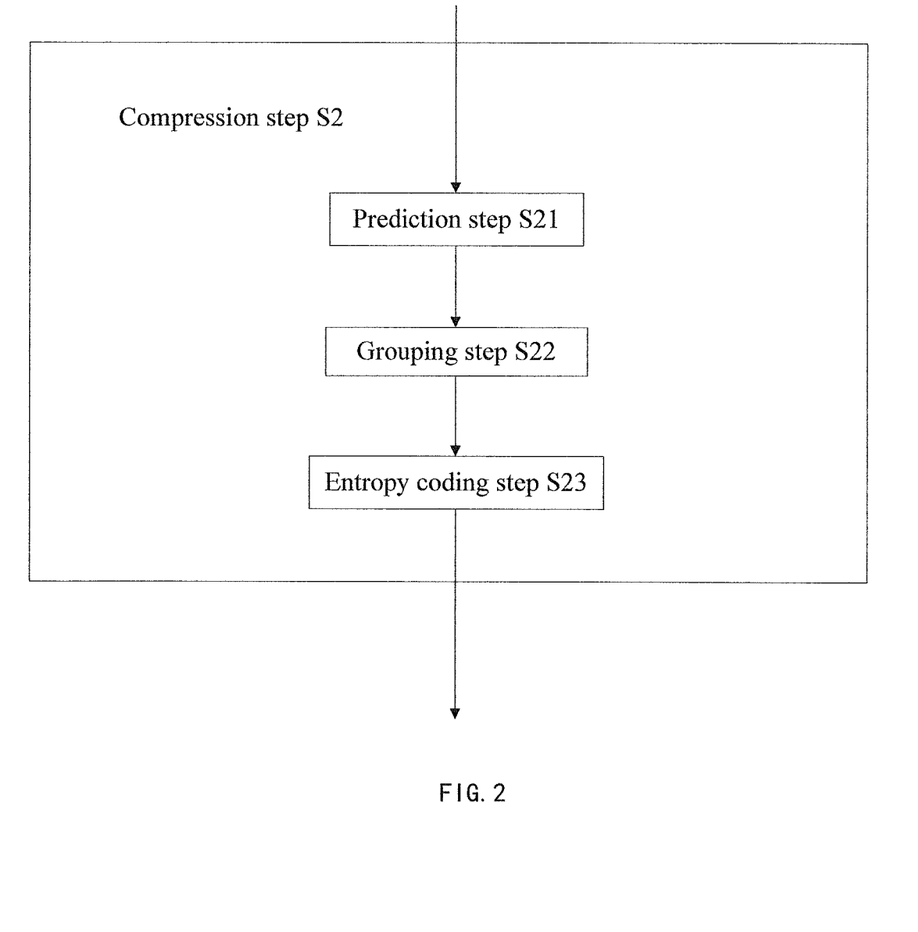
FIG. 2 is a step flowchart of a compression step in a flowchart of a lossless compression method applied to hardware video decoding according to the present invention.

The compression step S2 will be described below in combination with FIG. 2 in detail. In the compression step S2, a prediction step S21 is executed at first to execute a step of predicting Y luma blocks, U chroma blocks and V chroma blocks through prediction modes respectively and calculate predicted values. Then, a grouping step S22 is executed to execute a step of calculating residuals according to the predicted values and original values and group the residuals. Finally, an entropy coding step S23 is executed to perform entropy coding on values of the residuals grouped in the grouping step S22.

The prediction modes include horizontal prediction, vertical prediction and mean prediction. The entropy coding step includes calculating bit numbers of the Y luma blocks, the U chroma blocks or the V chroma blocks under each prediction mode according to the prediction mode and the residuals, finding the prediction mode making the smallest bit numbers of the Y luma blocks, the U chroma blocks or the V chroma blocks after prediction, and judging whether the smallest bit numbers exceed the original bit numbers of the Y luma blocks, the U chroma blocks and the V chroma blocks or not.

According to the lossless compression method of the present invention, a VD-LFRC algorithm is adopted and designed, the VD-LFRC algorithm implements lossless compression by taking each Y luma block with a size of 16×4 and the corresponding U chroma block and V chroma block with sizes of 8×2 as a compression unit, and the compression step mainly includes the prediction step, the grouping step and the entropy coding step.

Figure 3A:
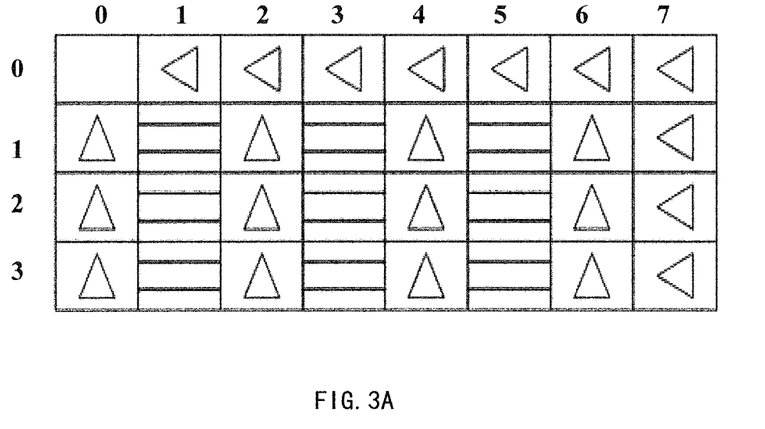
FIG. 3A is a luma prediction diagram of an embodiment of a lossless compression method applied to hardware video decoding according to the present invention.
Figure 3B:
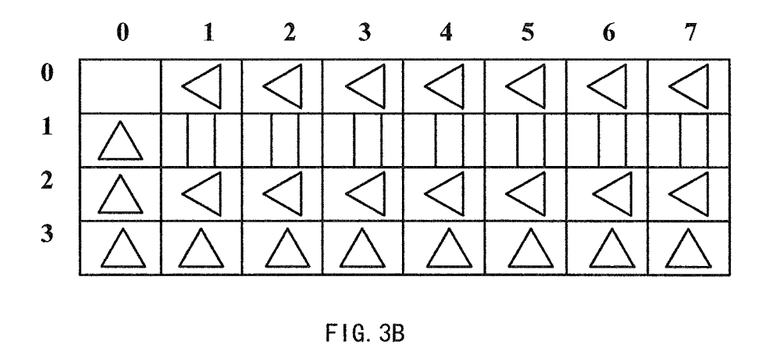
FIG. 3B is another luma prediction diagram of an embodiment of a lossless compression method applied to hardware video decoding according to the present invention.

Referring to FIGS. 3A and 3B, FIG. 3A is a luma prediction diagram of an embodiment of a lossless compression method applied to hardware video decoding according to the present invention, and FIG. 3B is another luma prediction diagram. For a compression unit, in the prediction step, the 16×4 Y luma block is divided into two blocks with sizes of 8×4 for respective compression, and the 8×2 U chroma block and the 8×2 V chroma block are compressed respectively. For each 8×4 Y luma block or the 8×2 U or V chroma block, prediction is performed at first, and the prediction mode may adopt horizontal prediction, vertical prediction and mean prediction algorithms. As shown in FIGS. 3A and 3B, |< represents horizontal prediction, and values on the left are adopted for prediction; △ represents vertical prediction, and values at the top are adopted for prediction; ≡ represents horizontal mean prediction, and values on the left and right of the horizontal direction are averaged for prediction; and ||| represents vertical mean prediction, and values at the top and bottom of the vertical direction are averaged for prediction.

Figure 4:
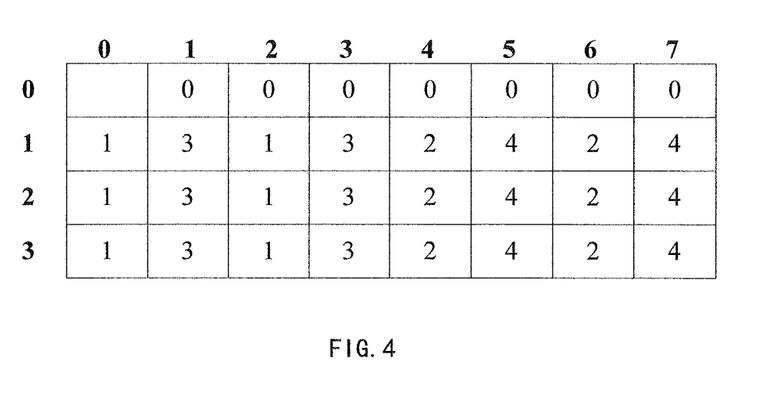
FIG. 4 is a residual grouping table for luma prediction of the embodiment of the lossless compression method applied to hardware video decoding shown in FIG. 3A according to the present invention.

By the above prediction step, as shown in FIG. 3A, the predicted values corresponding to each pixel have been obtained, then corresponding predicted value data is subtracted from the original data to obtain predicted residual values of each pixel, and the residual values are grouped according to different prediction modes in the grouping step. Referring to FIG. 4, the residual values are divided into five groups according to a prediction sequence and a dependency relationship.

Figure 5:
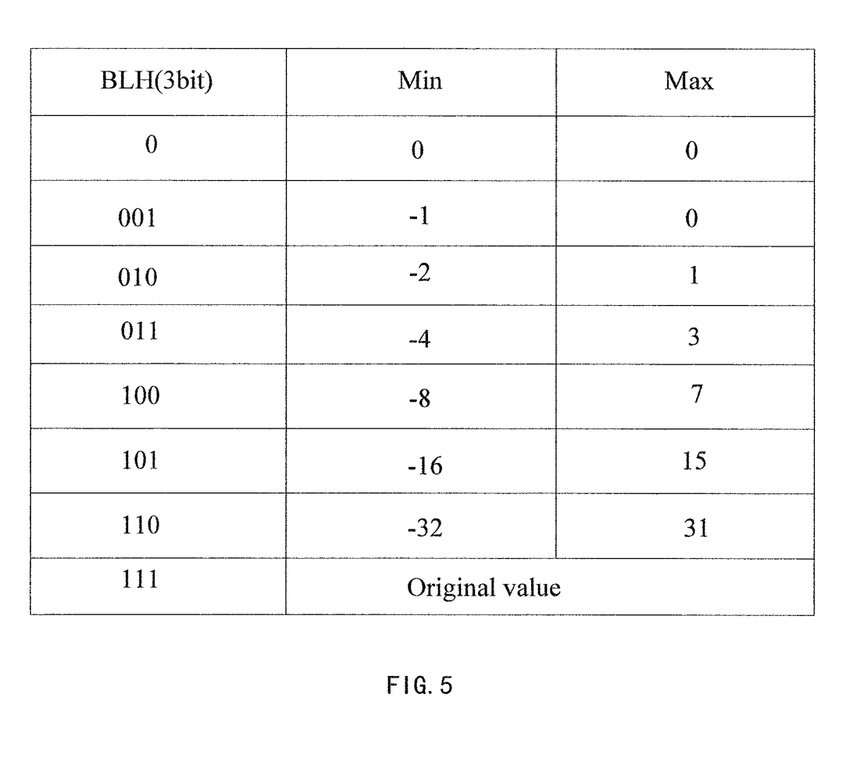
FIG. 5 is a Bit Length Header range corresponding table of an embodiment of a lossless compression method applied to hardware video decoding according to the present invention.

In the entropy coding step, entropy coding is performed on the grouped residual values. For convenient description, it is set that there are n groups, each group has m[i] residuals and i=0~n−1. At first, a maximum value and minimum value of the residuals in each group are found. Then, a bit number required by representation of the residuals in this range for the data of the group is calculated according to a Bit Length Header range corresponding table shown in FIG. 5, and is recorded as head_length[i], i=0~n, and the value is coded by fixedly 3 bits. Next, fixed-length entropy coding is performed on each piece of residual data in the group according to the head_length[i]. In addition, a Direct Current (DC) value, fixedly 8 bits, and a bit number required by the prediction mode are also required to be added for coding of the residual data of the whole group. For example, if four prediction modes are adopted for coding, the prediction modes are represented with fixedly 2 bits, and if eight prediction modes are adopted for coding, fixedly 3 bits are required to represent the prediction mode. Therefore, a total bit number after entropy coding of luma is calculated as follows:

$$\text{Total\_bit\_model} = 8 + \text{bit number required by the prediction mode} + n*3 + \sum_{i=0}^{n}(\text{head\_length}[i]*m[i]).$$

Bit numbers required after predictive coding in luma prediction modes are calculated, and the prediction mode corresponding to the smallest bit number is selected as an optimal mode for 8×4 compression of luma. In addition, in an entropy coding stage, whether the optimal total bit number exceeds the original data of the present block or not may be judged, the size of the original data block is 8×4, i.e., 32 bytes and further 256 bits, and if YES, the original data is directly used instead.

A compression algorithm for the 8×2 U chroma block and the 8×2 V chroma block is similar to the compression algorithm for the 8×4 luma block. The only difference is that U chroma components and V chroma components are only a half of luma in size and form only two lines, so that prediction modes for the chroma components may be reduced in terms of prediction. The other contents are the same as those for the luma.

Figure 6:
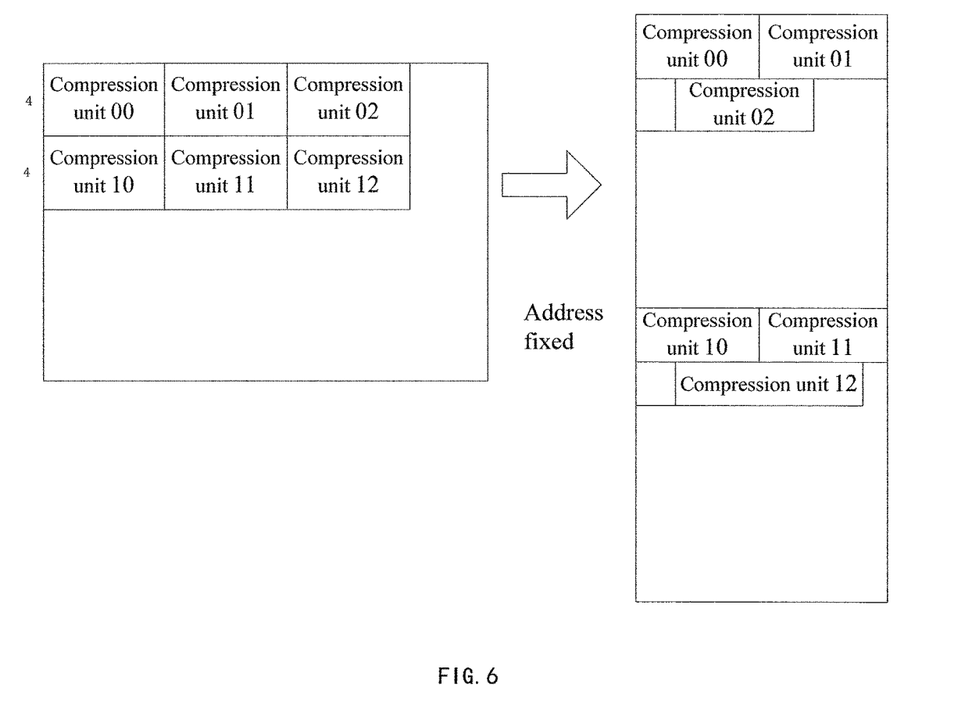
FIG. 6 is a diagram of a compressed data storage format in an embodiment of a lossless compression method applied to hardware video decoding according to the present invention.

After the above lossless compression step, compressed data is obtained. For matching with a video decoding module, a compressed data storage format shown in FIG. 6 is adopted for storage of the compressed data. That is, compact compression and storage is performed on the complete frame of image by taking four pixel lines as a unit, moreover, a starting address of every four pixel lines is fixed, and a starting address offset for storage after compression of every four lines is:

((Picture Width+15)>>4)*16*4*1.5.

For facilitating random access when reference frame data is read, besides data compression, it is also necessary to store overhead data representing a length of the compressed data, and a storage format of this part of data is as follows: every four compression units occupy 56 bits, the first 16 bits form offset information and represent an offset of a present storage address of the four compression units relative to the line where they are located, the latter 40 bits store information about the number of the bytes occupied by the four compression units and whether to compress them or not, each compression unit occupies 10 bits, the first two bits represent whether the two 8×4 Y luma blocks are required to be compressed or not, the third bit represents whether the two 8×2 U chroma block and 8×2 V chroma block are compressed or not, whether the U chroma block and the V chroma block are required to be compressed or not is judged by taking them as a whole, for reducing the bit number, the latter seven bits represent a value obtained by subtracting 1 from a total length of the present compression unit which is compressed, and byte is taken as a unit.

In a decoding process of the video decoding module, when a non-INTRA block is decoded, the reference frame data is required to be read from a DDR memory for interpolation operation, and a bandwidth consumed in reading of the reference frame data of this part is about 70% of a total decoding bandwidth of the video decoding module. For further reducing bandwidth consumption in reading of the reference frame data, after the VD-LFRC algorithm is adopted, a two-level Cache architecture is adopted for reading of the reference frame data. The first Cache is a 2D-Cache configured to cache the original YUV data obtained by VD-LFRC decompression, and existence of the 2D-Cache avoids the condition of repeatedly reading the same YUV data from the DDR memory. Since the data has been cached in the 2D-Cache, it may be directly read from the 2D-Cache when being read next time. In terms of specific design, multi-way direct mapping is adopted for this Cache. The size of the luma block is W1×H1×N1, W1 is the width, W1 may be set to be 32 in consideration of an attribute of the DDR memory, H1 is the height and may be set to be 8, 16, 32, 64 and the like, and N1 represents a way number and may be designed to be 2, 4, 8, 16 and the like. The size of the chroma block is W2×H2×N2, W2 is the width, W2 may also be set to be 32 in consideration of the attribute of the DDR memory, H2 is the height and may be designed to be 8, 16, 32 and the like, and N2 is the way number and may be designed to be 2, 4, 8, 16 and the like. In terms of replacement strategy, direct address mapping of the data of the complete frame may be adopted for both the luma and the chroma. A First In First Out (FIFO) strategy may be adopted for replacement of multiple ways to facilitate hardware implementation. The Cache of the other level is a Compress-Cache, and the Compress-Cache is configured to store the compressed data. When the compressed data read from the DDR memory is decompressed, there is a high probability that, in a decompression process, only part of the read compressed data is used and part of the compressed data is not decompressed but is required to be used at a maximum probability when reference frame data of the next block is read. For saving the bandwidth, the Compress-Cache is added to cache the compressed data. The size of the Cache is: W3×H3×N3, W3 may also be set to be 32 in consideration of the attribute of the DDR memory, H3 is the height and may be designed to be 8, 16, 32, 64 and the like, and N3 represents the way number and may be designed to be 2, 4, 8, 16 and the like. Since the luma and the chroma are compressed as a compression unit in the VD-LFRC algorithm, the Compress-Cache is not required to distinguish the luma and the chroma. In terms of replacement strategy, direct address mapping combined with the VD-LFRC algorithm is adopted. Since the VD-LFRC algorithm adopts compact arrangement of the complete frame of image by taking four pixel lines as a unit, in terms of address mapping, every four lines are mapped to a Cache Line, and the FIFO strategy is also adopted for replacement of the multiple ways.

Figure 7:
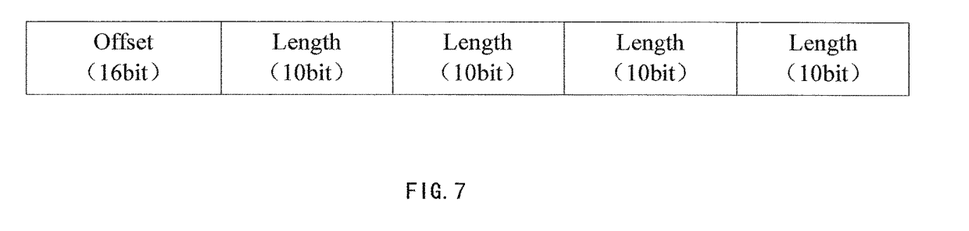
FIG. 7 is a diagram of an overhead data storage format of compressed data head information in an embodiment of a lossless compression method applied to hardware video decoding according to the present invention.
Figure 8:
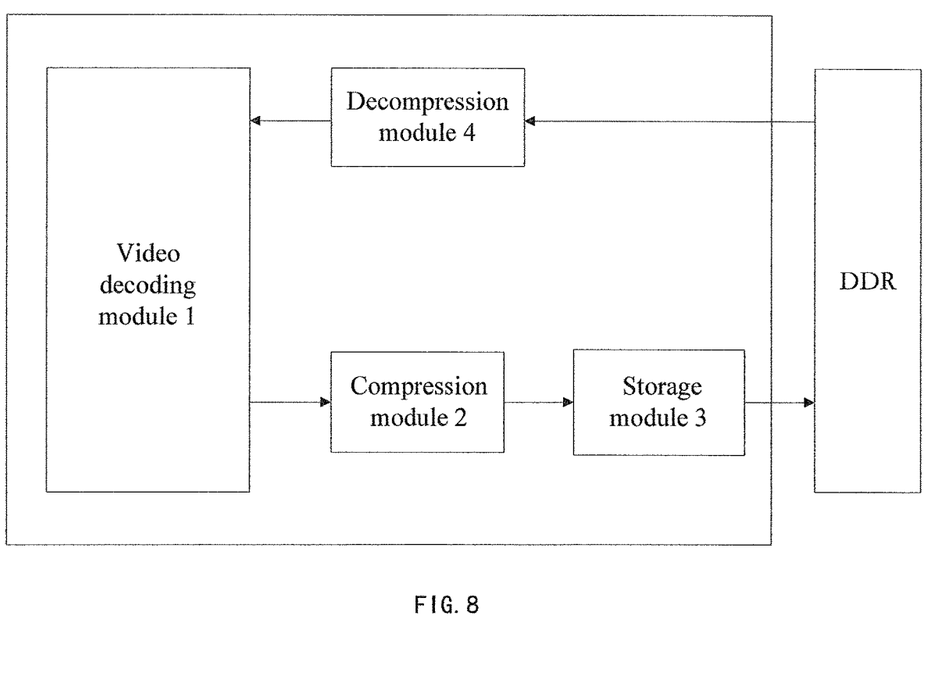
FIG. 8 is a structure block diagram of a lossless compression system applied to hardware video decoding according to the present invention.

The lossless compression method of the present invention is implemented in matching with the video decoding module. In combination with FIG. 8, FIG. 8 being a structure block diagram of a lossless compression system applied to hardware video decoding according to the present invention, it can be seen that the lossless compression system of the present invention includes a video decoding module 1 configured to decode video code stream data, a compression module 2 configured to perform lossless compression on YUV data output by the video decoding module 1 by adopting a VD-LFRC algorithm, a storage module 3 outputting and storing the compressed data in a DDR memory according to a certain storage format and a video decompression module 4 configured to, if reference frame data is required to be read when the video decoding module 1 decodes a non-INTRA block, decompress the compressed reference frame data. After the video decoding module 1 starts working, YUV data of Y luma blocks with block sizes of W_Y×H_Y and U chroma blocks and V chroma blocks with block sizes of W_UV×H_UV may be output. The compression module 2 performs compression by taking a compression unit as a unit, and a size of the compression unit includes a 16×4 Y luma block and a corresponding 8×2 U chroma block and 8×2 V chroma block. Therefore, for matching with the compression module 2, the sizes of the output blocks may meet the conditions as much as possible that W_Y is a multiple of 16, W_UV is a multiple of 8, H_Y is a multiple of 4, H_UV is a multiple of 2 and the sizes of the chroma blocks are ½ of the sizes of the luma blocks in both the horizontal direction and the vertical direction. If the conditions are not met, for example, the above conditions may not always be met when the video decoding module 1 decodes a Tile boundary block, at this moment, the video decoding module 1 may notify the compression module 2 that data of the present block is output in a non-compression manner and is not required to be compressed. After the compression module 2 receives the W_Y×H_Y Y luma blocks and W_UV×H_UV U chroma blocks and V chroma blocks, if the present blocks are required to be compressed, a VD-LFRC algorithm is adopted to compress the YUV data, and if the present blocks are not required to be compressed, the original YUV data is directly output. After receiving the data output by the compression module 2, the storage module 3 performs compact compression and storage on the complete frame of image by taking four pixel lines as a unit according to a storage format shown in FIG. 6, and a starting address of every four pixel lines is fixed for output. In addition, overhead data of head information is output and stored in the DDR memory according to an overhead data storage format of the compressed data head information shown in FIG. 7. When the video decoding module 1 decodes a non-INTRA block, it is necessary to read reference frame data for interpolation operation, and the decompression module 4 may read the compressed data and corresponding overhead data stored in the DDR memory, perform decompression operation to obtain the original YUV data and output the data to the video decoding module 1. Such processing is cyclically performed until all Macro Blocks (MBs) or Coding Units (CUs) of a frame or a field are completely decoded.

Figure 9:
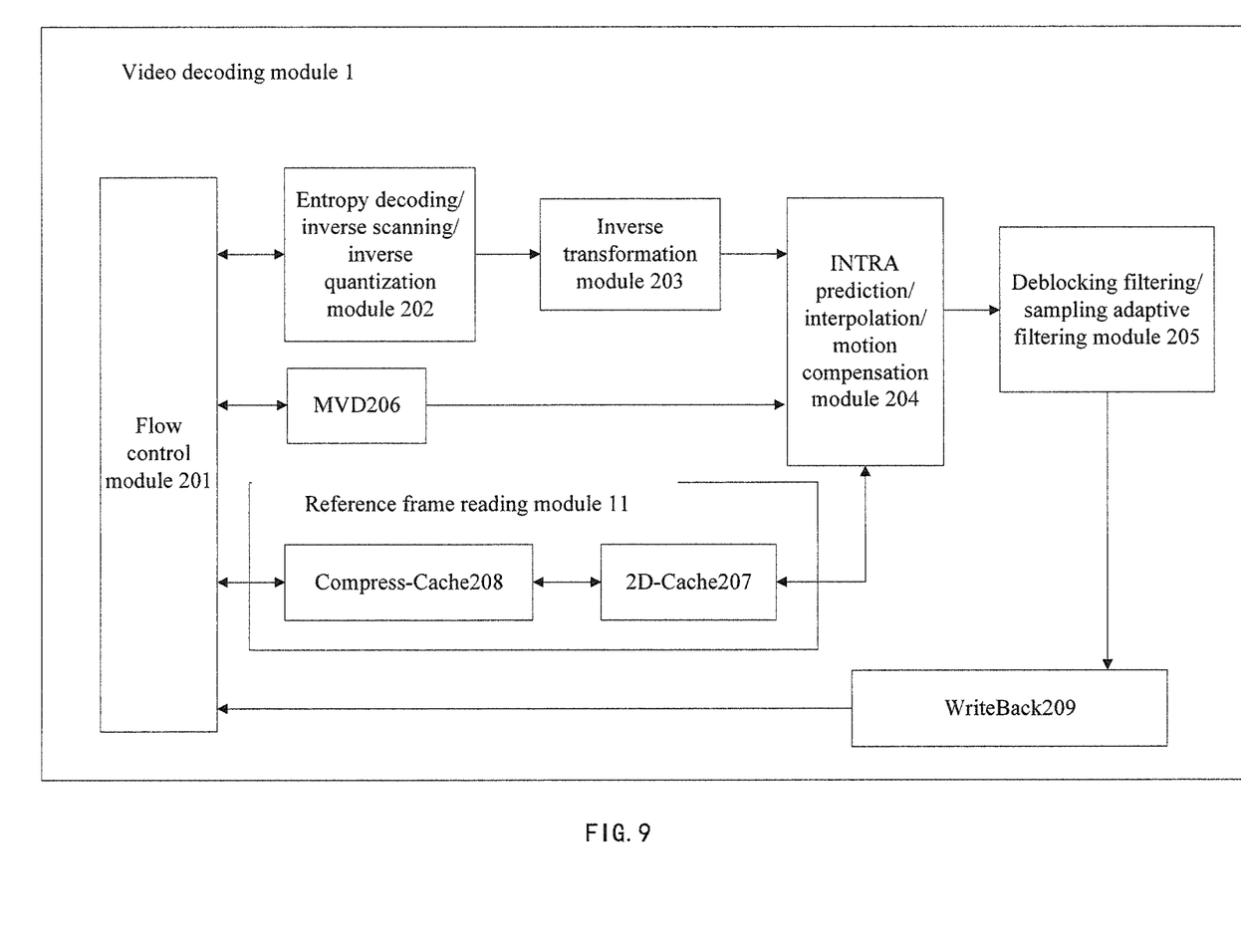
FIG. 9 is a structure block diagram of a video decoding module in a lossless compression system applied to hardware video decoding according to the present invention.

In combination with FIG. 9, an internal structure of the video decoding module 1 may be learned about. A flow control module 201 is mainly configured to distribute information of the MBs or CUs obtained by entropy decoding of an entropy coding/inverse scanning/inverse quantization module 202 to other modules and control sequential execution of each module according to each standard video decoding flow, wherein the information of the MBs or the CUs mainly includes information about an MB type, an INTRA prediction mode, a Motion Vector (MV) residual, a converted block size and the like and register information. In addition, the flow control module 201 receives a read-write request sent to the DDR memory by each other module and sends a request for read-write operation to an external DDR memory after internal arbitration processing.

The entropy decoding/inverse scanning/inverse quantization module 202 is mainly configured to perform Context-based Adaptive Binary Arithmetic Coding (CABAC) or Context-based Adaptive Variable Length Coding (CAVLC) on an input code stream, feed back control information of the MBs or CUs obtained by entropy decoding to the flow control module 201, simultaneously perform inverse scanning and inverse quantization on coefficient residual information obtained by entropy decoding and output inversely quantized residual data.

An inverse transformation module 203 is configured to perform inverse transformation on the inversely quantized residual data output by the entropy decoding/inverse scanning/inverse quantization module 202, 4×4, 8×8, 16×16 or 32×32 inverse transformation is determined to be performed according to the information, sent by the flow control module 201, of the MBs or the CUs, and the inverse transformation module 203 outputs inversely transformed residual data.

A Motion Vector Difference (MVD) module 206 obtains a Motion Vector Predictor (MVP) according to adjacent MV information or MV information of an MB at a backward corresponding position and adds the MV residual information obtained by decoding of the entropy decoding/inverse scanning/inverse quantization module 202 to obtain final MV information of each Prediction Unit (PU) of the present MB or CU.

A reference frame reading module 11 includes a 2D-Cache module 207 and a Compress-Cache module 208. The 2D-Cache module 207 is mainly configured to cache the original reference frame data to reduce a bandwidth requirement. After an INTRA prediction/interpolation/motion compensation module 204 sends a reference frame data reading request, the 2D-Cache module 207 performs matching with internally cached reference frame address information, reference index and the is like. In case of hitting, the corresponding reference frame data is directly read from the corresponding reference frame data from the 2D-Cache module 207 and output to the INTRA prediction/interpolation/motion compensation module 204. In case of no hitting, the compressed reference frame data is read from the Compress-Cache module 208 and then sent to the decompression module 4 for decompression, and the original reference frame data obtained by decompression is written into the 2D-Cache module 207. In case of no hitting in the Compress-Cache module 208, it is necessary to send a reading request to the DDR memory through the flow control module 201, and after the DDR memory sends the compressed reference frame data, on one hand, the compressed reference frame data is written into the Compress-Cache module 208 for caching; on the other hand, the compressed reference frame data is also required to be written into the decompression module 4 for decompression, and the original reference frame data obtained by decompression is also required to be written into the 2D-Cache module 207.

The INTRA prediction/interpolation/motion compensation module 204 is mainly configured to execute INTRA prediction on an INTRA block, execute INTER interpolation on an INTERR block and add residual data transmitted by the inverse transformation module 203 to obtain YUV video data before in-loop filtering.

A deblocking filtering/sampling adaptive filtering module 205 mainly performs loop filtering operation and adaptive sample point compensation operation on the YUV video data output by the INTRA prediction/interpolation/motion compensation module 204 and outputs a final reconstructed value.

A Write Back module 209 is configured to send a write request to the flow control module 201, and output the reconstructed YUV video data output by the deblocking filtering/sampling adaptive filtering module 205 to the flow control module 201 for the flow control module 201 to output the reconstructed YUV video data after internal arbitration, thereby completing the whole decoding process.

Figure 10:
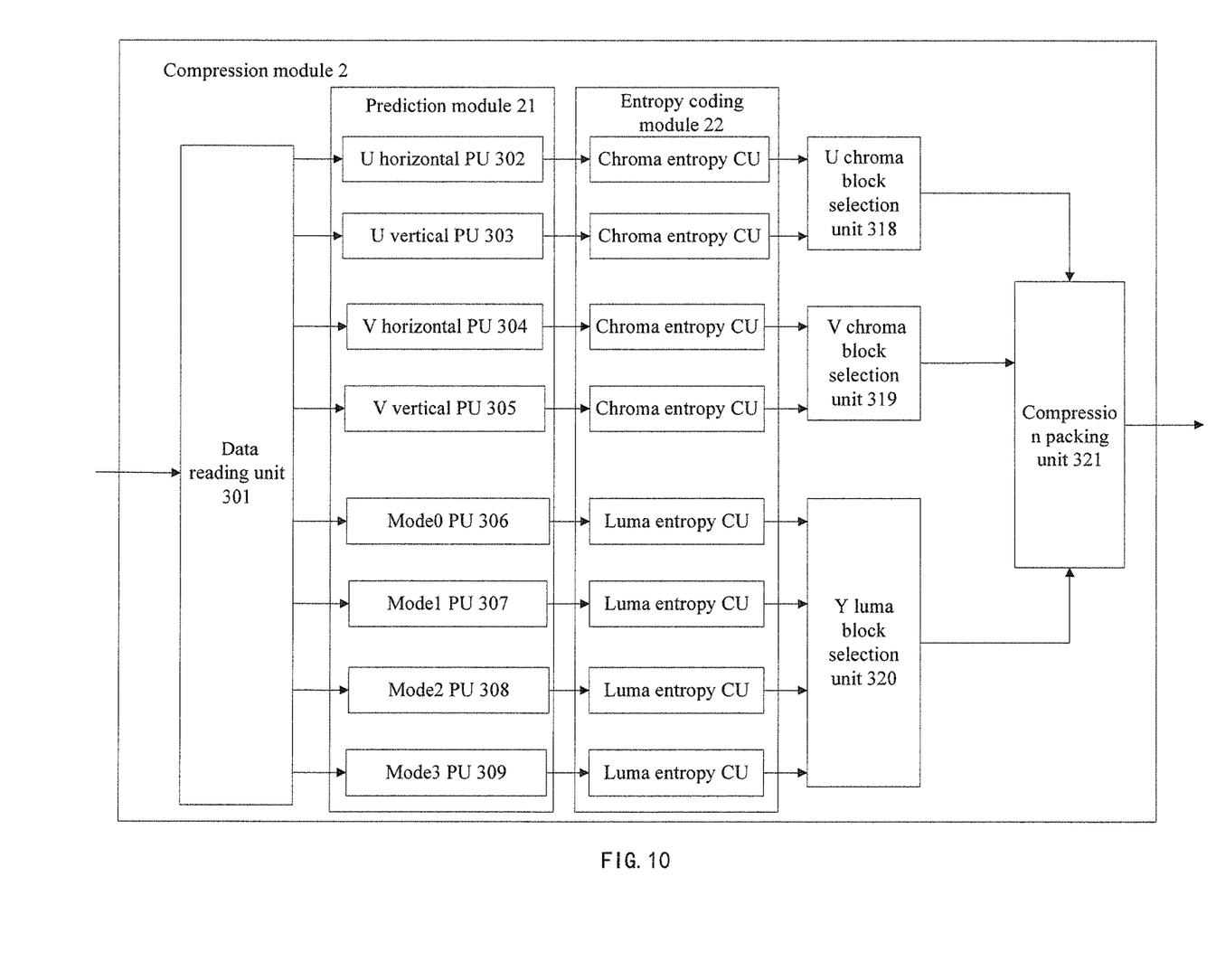
FIG. 10 is a structure block diagram of a compression module in a lossless compression system applied to hardware video decoding according to the present invention.

In combination with FIG. 10, an internal structure of the compression module 2 may be learned about. The compression module 2 includes a prediction module 21 and an entropy coding module 22, the prediction module 21 includes PUs for the Y luma blocks and horizontal PUs and vertical PUs for the U chroma blocks and the V chroma blocks under different prediction modes, and the entropy coding module 22 includes a chroma entropy CU and a luma entropy CU.

A data reading unit 301 reads the reconstructed YUV video data output by the flow control module 201 in the internal structure of the video decoding module 1 and inputs read luma data into a Mode 0 PU 306, a Model PU 307, a Mode 2 PU 308 and a Mode 3 PU 309 respectively to perform prediction under the corresponding prediction modes and calculate residuals under the corresponding prediction modes, then luma entropy coding is performed on the corresponding residuals, total bit numbers after coding in the present prediction modes are calculated, and the prediction mode corresponding to the smallest total bit number is selected from a Y luma block selection unit 320 as an optimal prediction mode for the Y luma blocks. Meanwhile, read U chroma block data is sent to a U horizontal PU 302 and a U vertical PU 303 respectively, V chroma block data is sent to a V horizontal PU 304 and a V vertical PU 305 respectively, horizontal prediction and vertical prediction are simultaneously performed on the U chroma block data and the V chroma block data to obtain residual data after horizontal prediction and vertical prediction of the corresponding U chroma blocks and V chroma blocks, then chroma entropy coding is performed, total bit numbers under the present prediction modes are calculated, the prediction mode corresponding to the smallest total bit number is selected from a U chroma block selection unit 318 as an optimal prediction mode for the U chroma blocks, and the prediction mode corresponding to the smallest total bit number is selected from a V chroma block selection unit 319 as an optimal prediction mode for the V chroma blocks. A compression packing unit 321 packs the coded data obtained under the selected optimal prediction modes for the Y luma blocks, the U chroma blocks and the V chroma blocks. At this moment, if the total bit numbers under the optimal prediction modes for the Y luma blocks, the U chroma blocks and the V chroma is blocks exceed lengths of the original YUV video data or the present blocks are identified to be uncompressed blocks, data of the present blocks directly adopts the original YUV video data, the compressed and packed data is stored according to a format in FIG. 6 in the method embodiment, overhead data is stored according to a format in FIG. 7, and the packed compressed data is output to the storage module 3 for output and storage.

Figure 11:
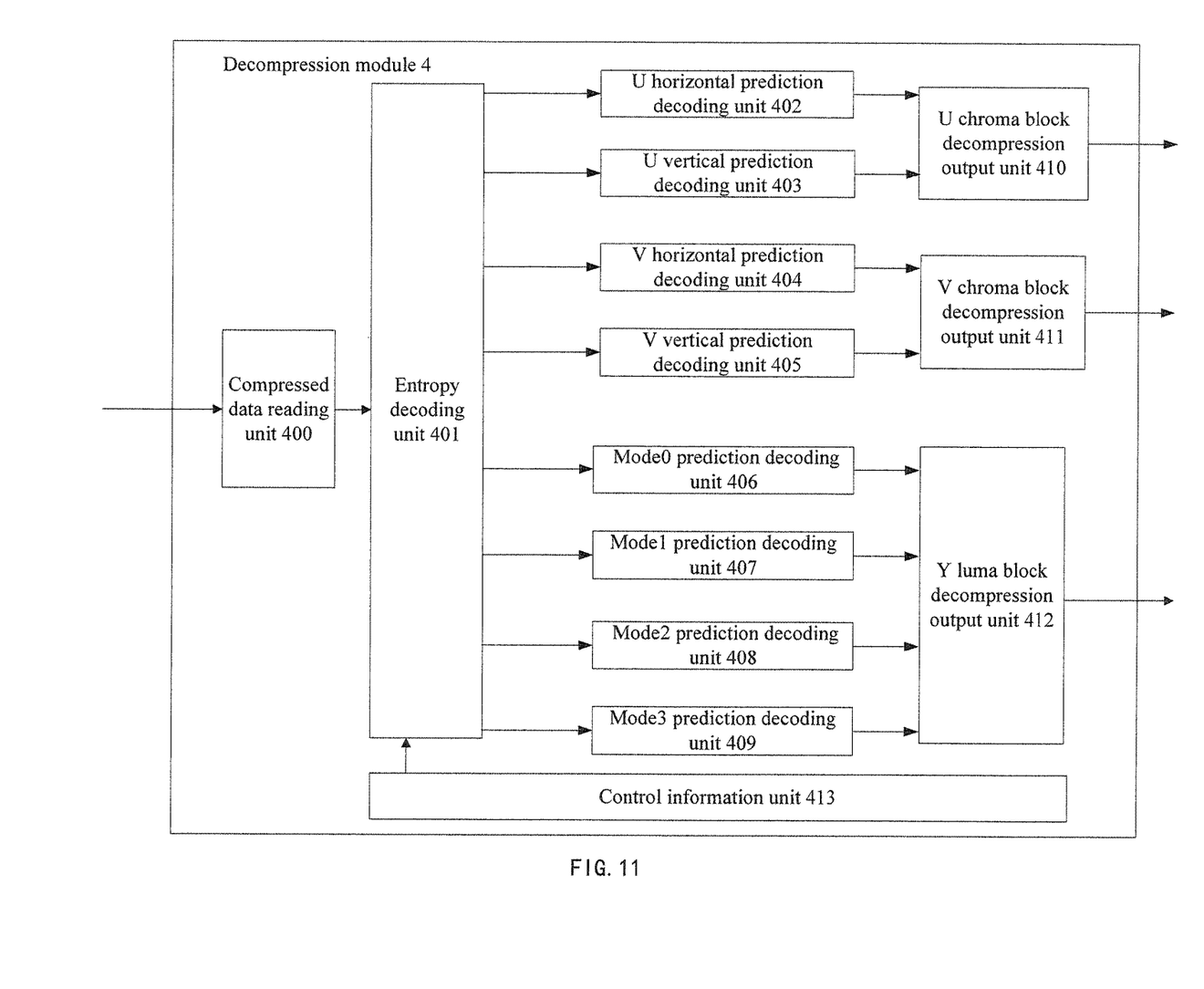
FIG. 11 is a structure block diagram of a decompression module in a lossless compression system applied to hardware video decoding according to the present invention.

In combination with FIG. 11, an internal structure of the decompression module 4 may be learned about. The 2D-Cache module 207 in the internal structure of the video decoding module 1 may send a reference frame data reading request to the flow control module 201 under the condition that the reference frame data is not hit, returned compressed data and overhead data may be output to a compressed data reading unit 400, and an entropy decoding unit 401 may perform entropy decoding on the compressed reference frame data according to control information of each compression unit and obtain residual information, wherein the control information is from a control information unit 413.

In addition, the entropy decoding unit 401 may select according to the control information unit 413 to send the U chroma block residual information to a U horizontal prediction decoding unit 402 or a U vertical prediction decoding unit 403 for decoding, send the V chroma block residual information to a V horizontal prediction decoding unit 304 or a V vertical prediction decoding unit 305 for decoding, and send the Y residual information to a Mode 0 prediction decoding unit 406, a Model prediction decoding unit 407, a Mode 2 prediction decoding unit 408 and a Mode 3 prediction decoding unit 409 for decoding, and after prediction decoding of the YUV video data under different prediction modes is completed, outputs the U chroma blocks decoded under different prediction modes to a U chroma block decompression output unit 410 respectively, outputs the V chroma blocks decoded under different prediction modes to a V chroma block decompression output unit 411 respectively, outputs the Y luma blocks decoded under different prediction modes to a Y luma block decompression output unit 412 respectively, and sends the output decompressed YUV video data to the INTRA prediction/interpolation/motion compensation module 204 in the internal structure of the video decoding module 1 for INTER interpolation calculation.

From the above, it can be seen that a two-level Cache design architecture matched with the video decoding module 1 is adopted in the present invention, and by the two-level Cache design architecture, a reference frame data reading bandwidth is reduced, thereby reducing bandwidth consumption in decoding of the video decoding module 1.

It is finally important to emphasize that the embodiment is only the preferred solution of the present invention and more variations may also be made during a practical application. For example, different prediction modes are used or the number of the prediction modes is changed. Such changes may also achieve the purposes of the present invention and shall also fall within the scope of protection of the claims of the present invention.

INDUSTRIAL APPLICABILITY

In the decoding process of the video decoding module in the method of the present invention, the bandwidth consumed in reading of the reference frame data is about 70% of the total bandwidth. For reducing the bandwidth consumption in reading of the reference frame data, the two-level Cache design architecture matched with VD-LFRC is adopted in the present invention, and by the two-level Cache design architecture, the reference frame data reading bandwidth is greatly reduced, thereby reducing the bandwidth consumption in decoding of the video decoding module.

In the system of the present invention, compression is performed by taking a 16×4 luma block and corresponding 8×2 chroma blocks as a compression unit, and each compression unit is compactly arranged by the byte, so that the block data decoded and output by the video decoding module may be timely compressed without developing an additional buffer for caching the data.

The invention claimed is:

1. A lossless compression method applied to hardware video decoding, sequentially comprising a video decoding step, a compression step, a storage step and a decompression step, wherein the video decoding step comprises a step of decoding a video code stream and outputting decoded YUV data while preset conditions are met; wherein data of the present block is output in a non-compression manner while the preset conditions are not met;

the compression step comprises a step of performing lossless compression on the YUV data output by the video decoding step;

the storage step comprises a step of storing losslessly compressed data; and the decompression step comprises a step of decompressing the losslessly compressed data and recovering original YUV data, wherein, in the compression step, lossless compression is performed by taking a 16×4 Y luma block and a corresponding 8×2 U chroma block and 8×2 V chroma block as a compression unit;

in the storage step, compact compression and storage is performed on a complete frame of image by taking four pixel lines as a unit, and a starting address of every four pixel lines is fixed; and the video decoding step comprises a reference frame reading step, a two-level Cache structure is adopted in the reference frame reading step, and in the two-level Cache structure, the first level is a Compress-Cache which caches the compressed data, and the other level is a 2D-Cache which caches decompressed original YUV data, wherein the preset conditions include a size of one or more of the 16×4 Y luma block and the corresponding 8×2 U chroma block and 8×2 V chroma block as the compression unit.

2. The lossless compression method applied to hardware video decoding of claim 1, wherein the compression step comprises a prediction step, a grouping step and an entropy coding step;

the prediction step comprises a step of predicting Y luma blocks, U chroma blocks and V chroma blocks through prediction modes respectively and a step of calculating predicted values;

the grouping step comprises a step of calculating residuals according to the predicted values and original values and a step of grouping the residuals; and the entropy coding step comprises a step of performing entropy coding on values of the residuals grouped in the grouping step.

3. The lossless compression method applied to hardware video decoding of claim 2, wherein the prediction modes comprise horizontal prediction, vertical prediction and mean prediction.

4. The lossless compression method applied to hardware video decoding of claim 2, wherein the entropy coding step comprises a step of calculating bit numbers of the Y luma blocks, the U chroma blocks or the V chroma blocks under each prediction mode according to the prediction mode and the residuals and a step of finding the prediction mode making smallest bit numbers of the Y luma blocks, the U chroma blocks or the V chroma blocks after prediction, and judging whether the smallest bit numbers exceed original bit numbers of the Y luma blocks, the U chroma blocks and the V chroma blocks or not.

* * * * *